US006189437B1

(12) United States Patent
Morlan

(10) Patent No.: US 6,189,437 B1
(45) Date of Patent: Feb. 20, 2001

(54) BRAKE BOOSTER HAVING MEANS FOR MOUNTING ON A WALL

(75) Inventor: William Frank Morlan, Granger, IN (US)

(73) Assignee: Robert Bosch Corporation, Broadview, IL (US)

( * ) Notice: Under 35 U.S.C. 154(b), the term of this patent shall be extended for 0 days.

(21) Appl. No.: 09/385,475

(22) Filed: Aug. 30, 1999

(51) Int. Cl.$^7$ .............................. F16J 15/18; F01B 11/02
(52) U.S. Cl. ..................... 92/165 PR; 92/169.3
(58) Field of Search .................. 92/165 R, 165 PR, 92/169.2, 169.3, 169.4

(56) References Cited

U.S. PATENT DOCUMENTS

| 4,339,921 | * | 7/1982 | Schanz ................... 92/165 PR X |
| 5,410,880 | * | 5/1995 | Schluter ................. 92/169.3 X |
| 5,447,030 | * | 9/1995 | Wang et al. ............. 92/169.3 X |
| 5,487,327 | * | 1/1996 | Schluter et al. ........ 92/165 PR X |
| 6,050,174 | * | 4/2000 | Schonlau et al. ....... 92/169.3 |

\* cited by examiner

Primary Examiner—John E. Ryznic
(74) Attorney, Agent, or Firm—Leo H. McCormick, Jr.; Warren Comstock

(57) ABSTRACT

A brake booster having a front shell joined to a rear shell with the interior separated by a wall to at least define a first front chamber and a first rear chamber. A reinforcement plate located adjacent an end face of the front shell has a plurality of studs for attaching a master cylinder to the front shell. First and second tubes which extend through the wall each have having a first end sealed with respect to the front shell and a second end sealed with respect to the rear shell. A fastener arrangement extends through the first and second tubes for attaching the brake booster to a wall of a vehicle. The fastener arrangement is characterized by first bushing members located between the front shell and reinforcing plate and a second bushing members secured to the rear shell. The first bushing members each including a first cylindrical body which have a stepped bore defined by a first diameter separated from a second diameter by a first shoulder. The first end of the first and second tubes being correspondingly located in the second diameter of each first cylindrical member. The first diameter of each first cylindrical body has first threads thereon. The fastener arrangement further including a first bolt and a second bolt each of which has a stem with a head on a first end and a second end. The stem of the first and second bolts each having second threads thereon adjacent the head and third threads thereon adjacent the second end. The third threads being smaller than the second threads such that the third threads on each stem correspondingly pass through the first threads on the first and second cylindrical members. The second threads of each stem correspondingly engage the first threads on each first cylindrical member to join the first and second bolts to the first and second cylindrical members and position the third threads outside of the rear shell for later engagement with a corresponding nut to attach the booster to the wall.

5 Claims, 2 Drawing Sheets

US 6,189,437 B1

BRAKE BOOSTER HAVING MEANS FOR MOUNTING ON A WALL

This invention relates to a brake booster having first and second bolts which are attached to a reinforcing plate to mount the brake booster on a wall in a vehicle.

BACKGROUND OF THE INVENTION

It is common practice for a housing for a brake booster to be manufactured from a front shell which is joined to a rear shell through some type of lancing operation, such as disclosed in U.S. Pat. No. 4,267,766. In this type booster, the front shell and the rear shell have the same diameter and as a result a uniform appearance is produced. In an effort to increase the output of brake boosters various methods have been devised to double the size of the housing while maintaining the same effective diameter. U.S. Pat. Nos. 3,146,682; 389,547; 3,517,588; 5,076,142 and 5,323,689 disclose various tandem brake boosters wherein a front shell functions as part of the housing for a plurality of movable wall to produce an output force which is greater than a single brake booster. In this type tandem brake booster the increase in size or length is normally achieved by an increase in the front shell. The increase in physical size in the front shell requires larger stamping equipment and under the hood space than corresponding shells for a single brake booster. These tandem brake boosters function in an adequate manner but at an increase in the weight and may not be acceptable for some customer's applications. In an effort to reduce the weight of a brake booster it has been suggested that a lighter weight or gauge material could be used for the front and rear shells if the forces generated during braking could be directly transmitted from a master cylinder to a wall that separates the engine compartment from the passenger compartment. U.S. Pat. Nos. 4,377,069; 4,783,964; 4,790,235; 5,072,996 and 5,447,030 disclose such structure wherein bolts that connected a master cylinder to a brake booster extend through the interior of a brake booster and are attached to the wall of a vehicle. In the type of structure the movable wall, which is sealed with respect to the bolts, most often slides on the bolts to create a desired braking force. Unfortunately, the sliding surface on the bolts and the cross-sectional diameter for carrying the forces do not provide a resulting brake booster with optimal non-frictional resistance, sealing capability or strength requirements. In an effort to separate the responsibility for these components, brake boosters have been manufactured with tubes therein to provide uniform sliding surfaces for movement of the wall while bolts are sized for the desired strength needed to resist deflection. The bolts being installed by an end user to attach the brake booster to a wall of a vehicle. Recently some end users have decided that it is desirable that manufacturers provide a complete brake booster with all components attached thereto for installation on the wall of a vehicle.

SUMMARY OF THE INVENTION

In an effort to provide a brake booster of simple structure that would meet current customer desires and functional specifications, I have invented a brake booster having a front shell joined to a rear shell with the interior separated by a wall to at least define a first front chamber and a first rear chamber. The brake booster includes a reinforcement plate located adjacent an end face of the front shell which has a plurality of studs for attaching a master cylinder to the front shell. First and second tubes which extend through the wall each have having a first end sealed with respect to the front shell and a second end sealed with respect to the rear shell. A fastener arrangement extends through the first and second tubes for attaching the brake booster to a wall of a vehicle. The fastener arrangement is characterized by first bushing members that are located between the front shell and reinforcing plate and by second bushing members which are secured to the rear shell. The first bushing members each retained in the reinforcing plate that have a first cylindrical body with a stepped bore defined by a first diameter separated from a second diameter by a first shoulder. The first end of each of the first and second tubes is correspondingly located in the second diameter of the first cylindrical members. The first diameter of each first cylindrical body has first threads thereon. The fastener arrangement further includes a first bolt and a second bolt each of which has a stem with a head on a first end and a second end. The stem of the first and second bolts each have second threads thereon adjacent the head and third threads thereon adjacent the second end. The third threads being smaller than the second threads such that the third threads on each stem correspondingly pass through the first threads on the first and second cylindrical members. The second threads of each stem correspondingly engage the first threads on each first cylindrical member to join the first and second bolts to the first and second cylindrical members and position the third threads outside of the rear shell. The brake booster with first and second bolts secured thereto is ready for installation on the wall of a vehicle by an end user by aligning the second ends with corresponding openings in the wall and attaching a nut to the third threads.

An advantage of the present invention resides in the permanent attachment of first and second bolts to corresponding bushings connected to a reinforcing plate which carries studs for a master cylinder to transmit forces to a wall of a vehicle.

A further advantage of this invention is to provide a brake booster with a force transmission path from a master cylinder to a wall in a vehicle by mounting studs for the master cylinder, a reinforcing plate which carries the studs, first and second bushings retained by the reinforcing plate, and first and second bolts correspondingly secured to the bushings and the wall.

DETAILED DESCRIPTION

Figure 1:
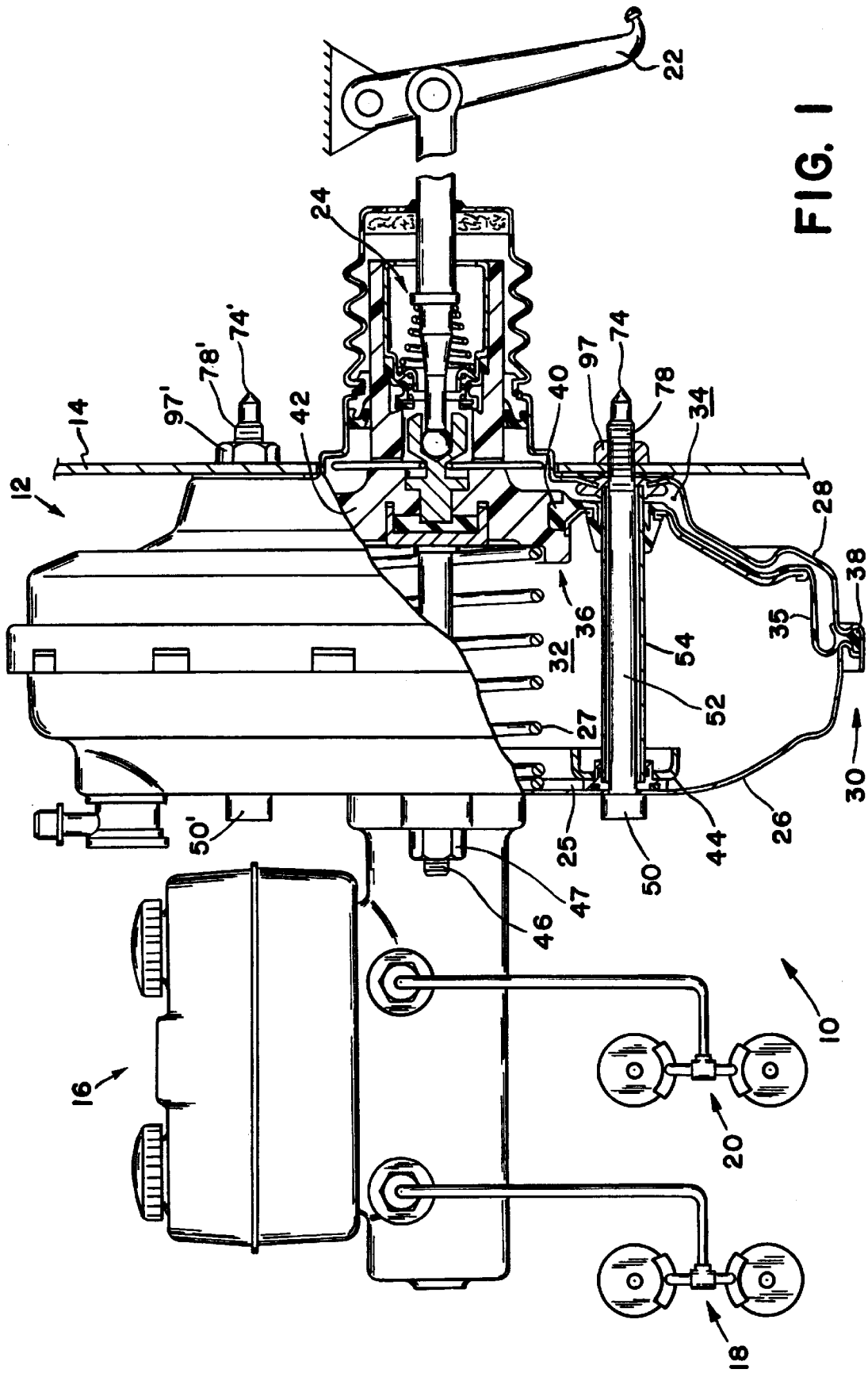
FIG. 1 is a schematic illustration of a brake system having a vacuum brake booster made according to the present invention.

A brake system 10 is schematically shown in FIG. 1 as having a vacuum brake booster 12 which is retained on a wall 14 of a vehicle. A master cylinder 16 which is connected to first 18 and second 20 wheel brakes of the vehicle is attached to the brake booster 12. The brake booster 12 receives an input from an operator through pedal 22 to operate valve 24 for the development of an output force which pressurizes fluid through movement of pistons in the master cylinder 16 to effect a brake application. During the development of the pressurization of fluid in the master cylinder 16 reaction forces are produced which are opposed or carried into the wall 14 through the brake booster 12 to maintain a substantially stable structural relationship between the components of the brake system. Through this specification and in the drawings certain components that are identical may be identified by the same number with a ' added thereto.

Figure 4:
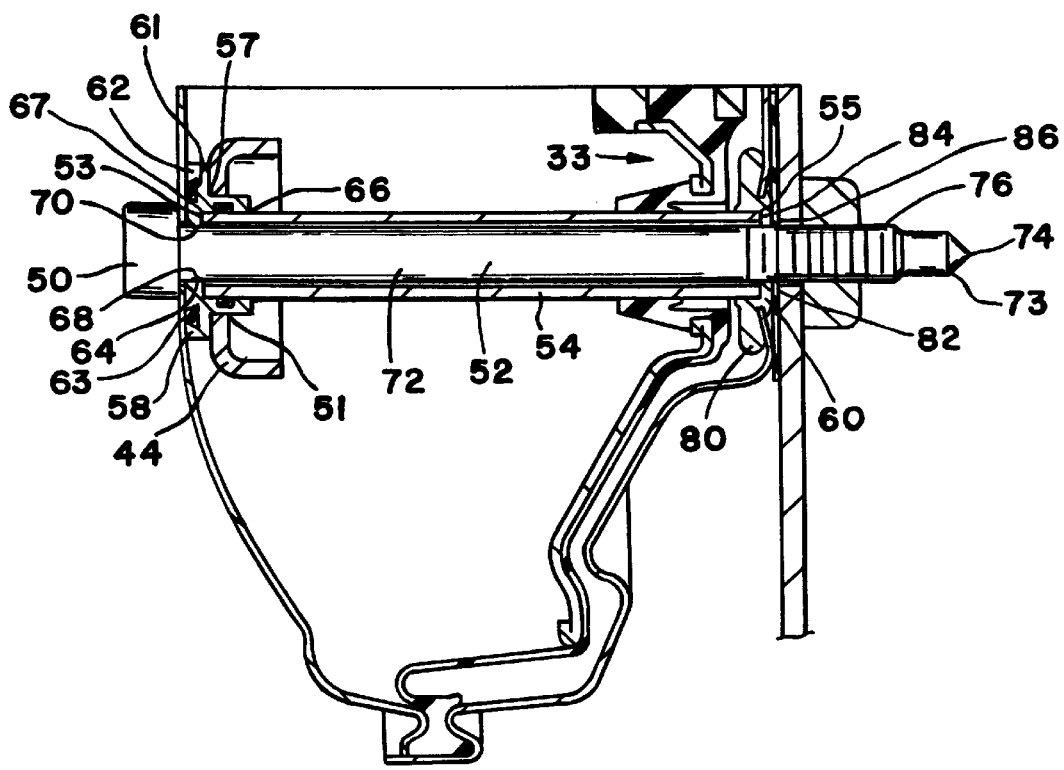
FIG. 4 is an enlarged sectional view of the fastener arrangement of FIG. 1.

In more particular detail as illustrated in FIG. 4, the brake booster 12 consists of a housing made of a first shell 26 which is joined to a rear shell 28 through a twist lock arrangement 30. The interior of the housing is divided by a movable wall 36, which has a diaphragm 35 with a first rib 38 retained by the twist lock arrangement 30 and a second rib 40 located on a hub 42 which retains valve 24, into at least a front chamber 32 and a rear chamber 34.

A reinforcement plate 44 which is located adjacent an end face 25 of the front shell 26 has a plurality of studs 46 (only one of which is illustrated in FIGS. 1 and 4) through which the master cylinder 16 is attached to the brake booster 12.

Figure 2:
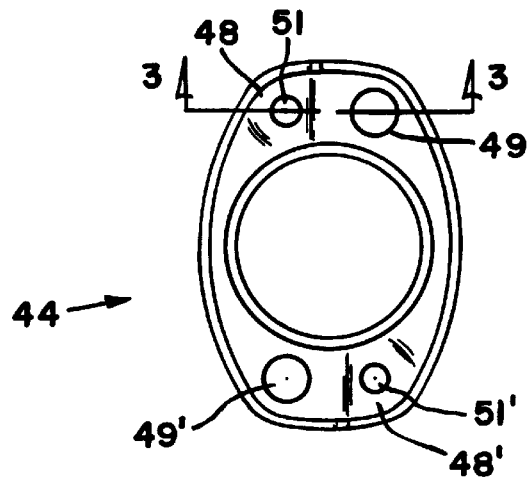
FIG. 2 is a view taken along line 2—2 of FIG. 1 showing the reinforcing plate.
Figure 3:
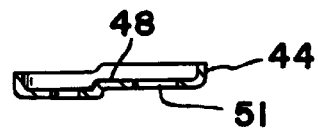
FIG. 3 is an enlarged sectional view taken along line 3—3 of FIG. 2.

The reinforcing plate 44 as best seen in FIGS. 2 and 3 has an oval shape with raised portions 48,48' for receiving of bolts 52 which pass through openings 51,51'. Each of the opening 51,51' receive a bushing 58 (only one of which is illustrated) which carry corresponding tubes 54 (only one of which is illustrated) while studs 46 (only one of which is illustrated) are located in openings 49,49' and fixed to the reinforcing plate 44 through a weld. The master cylinder 16 is attached to studs 46 by nuts 47 (only one of which is illustrated) and holds reinforcing plate 44 against end face 25 such that an airtight seal is produced. During the pressurization of the fluid by movement of the pistons contained therein operational forces are created which could separate the master cylinder 16 from the front shell 26. Resistance to the operational forces is transmitted through studs 46 into the reinforcing plate 44.

First 54 and second tubes which extend through the movable wall 36 each have a first end 53 sealed with respect to the front shell 26 through first bushing means 58 and a second end 55 sealed with respect to the rear shell 28 through second bushing means 60.

The first bushing means 58 are located between the front shell 26 and reinforcing plate 44 while the second bushing means 60 are secured to the rear shell 28. The first bushing means 58 each have a cylindrical body 62 that passes through opening 51 until a shoulder 57 engages the reinforcing plate 44. Cylindrical body 62 has a stepped bore therein defined by a first diameter 64 separated from a second diameter 66 by a first shoulder 67. The first end 53 of the tubes 54 is located in second diameter 66 of the cylindrical members 62. The first diameter 64 of the cylindrical bodies 62 has a threaded section 68 thereon.

The fastener means which includes a first bolt 52 and second bolt each of which has a stem 72 that extends from head 50 on a first end to a second end 74. The stem 72 of each bolt 52 has a threaded section 70 thereon adjacent head 50 and another threaded section 76 adjacent a conical tip 73 of the second end 74. Threaded section 76 has a smaller diameter than the threaded section 70 which is designed to mate with the threads 68 on the first and second cylindrical members 62 while the threaded section 76 passes through threads 68.

The second bushing means 60 includes a first disc 80, which is fixed to the rear shell 28 by a staking operation. The first disc 80 has a central opening 82 surrounded by an annular groove 84 for receiving the second end 55 of tube 54. The first 54 and second tubes are loosely retained between first 58 and second 60 bushing means as they are not designed to carry substantially any reaction forces generated between master cylinder 16 and communicated from the first 46 and second studs into reinforcing plate 44.

Method of Assembly of the Brake Booster

A front shell 26 is obtained from a source of supply and a reinforcing plate 44 having an oval shape is placed against the front face 25. First 58 and second bushings are located in openings 51,51' while studs 46 are located in openings 49,49' and pass through the end face 25 of the front shell 26. A welding operation is performed to secure the studs 46 and seal the openings in the front shell 26.

The second bushings 60 are located in opening in the rear shell 28 through a staking operation wherein disc 80 is aligned with its central opening 86 surrounded by an annular groove 88 on the interior of shell 28. Annular groove 84 receives the second end 55 tubes 54.

Tubes 54 pass through an opening and seal arrangement 33 in the wall 36 and first end 53 is located in diameter 66 of the first bushings 58 while the second end 55 located in annular groove 88 on the second bushings 60. Spring 27 is compressed and the first 26 and second 28 shells brought together to perform lancing to create the twist lock 30. At this there is some tolerance between end 53 and bearing 58 and end 55 and bearing 60 as the tubes are not intended to carry any load but to function as a surface on which wall 36 moves to develop and output force.

After the lancing procedure to develop the twist lock 30 has been achieved, bolts 52 are inserted into tubes 54. Since threads 76 are appropriately sized end 74 passes through bushing 58 until threads 70 engages threads 68 after which a torque is applied to head 50 to secure the bolts 52 to brake booster 12. In this position, threads 76 are located on the outside of shell 28. A plastic cap is placed over end 74 to protect threads 76 during shipment to an end user.

Once an end user obtains the brake booster 12, the end cap is removed and cone shaped end 74 aligned with corresponding openings in the wall 14 of the vehicle. Nuts 97 are attached to bolts 52 to complete the installation in a vehicle.

Mode of Operation

An input force applied to pedal 22 is translated into valve 24 which initially terminates communication between the first chamber 32 and first rear chamber 34 and later allows air to enter the first rear chamber 34 to develop a pressure differential across wall 36. This pressure differential acts on wall 36 and moves the wall 36 toward the face 25 of the front shell 26 to produce a force that moves pistons in master cylinder 16 and pressurizes fluid which is communicated to the first 18 and second 20 wheel brakes to effect a brake application. As wall 36 moves it slides on tubes 54 in a sealed manner without introducing frictional resistance which would subtract from development of an output force for operating the master cylinder 16.

When the fluid in the master cylinder 16 is pressurized a reaction force develops which is communicated directly from the master cylinder 16 to wall 14 by way of bolts 52 as bolts 52 are secured to reinforcing plate 44 and as a result the twist lock arrangement 30 does receive any substantial reaction forces. Thus, the material thickness of the first shell 26 and rear shell 28 can be reduced while at the same time the brake booster 12 performs in a satisfactory manner to produce an output force to effect a brake application.

I claim:

1. A brake booster having a front shell joined to a rear shell with the interior separated by a wall means to at least define a first front chamber and a first rear chamber, a reinforcement plate located adjacent an end face of said front shell has a plurality of studs for attaching a master cylinder to the front shell, first and second tubes extending through said wall means and each being having a first end sealed with respect to said front shell and a second end sealed with respect to said rear shell and fastener means extending through said first and second tubes for attaching said brake booster on an wall of a vehicle, said brake booster being characterized by first bushing means located between said front shell and reinforcing plate and second bushing means secured to said rear shell, said first bushing means including a first cylindrical body and a second cylindrical body each of which have a stepped bore defined by a first diameter separated from a second diameter by a first shoulder, said first end of said first and second tubes being correspondingly located in said second diameter of said first and second cylindrical members, said first diameter of said first and second cylindrical bodies each having first threads thereon, said fastener means including a first bolt and a second bolt each of which has a stem with a head on a first end and a second end, said stem of said first bolt and said second bolt each having second threads thereon adjacent said head and third threads thereon adjacent said second end, said third threads being smaller than said second threads such that said third threads on said stem passing through said first threads on said first and second cylindrical member while said second threads thereon engage said first threads to correspondingly join said first bolt with said first cylindrical member and said second bolt with said second cylindrical member to position said third threads outside of said rear shell to later engagement with corresponding nuts to attach said booster to said wall.

2. The brake booster as recited in claim 1 wherein said reinforcing plate is characterized by first and second raised portions for receiving and holding said first and second cylindrical members against said first shell.

3. The brake booster as recited in claim 2 wherein said first and second cylindrical members each retain first and second seals for sealing said first chamber from the environment.

4. The brake booster as recited in claim 2 wherein said second end of said first and second studs have a cone shape to assist in the alignment of said booster with an opening in said wall.

5. The brake booster as recited in claim 1 wherein said second bushing means including a first disc and a second disc fixed to said rear shell, said first disc and said second disc each having a central opening which is surrounded by an annular groove for correspondingly receiving said second end of said first and second tubes, said first and second tubes being loosely retained between said first and second bushing means such that substantially all reaction forces generated between said master cylinder are communicated from said first and second studs to said wall by way of said reinforcing plate and said first and second stems.

* * * * *